United States Patent
Lee et al.

(10) Patent No.: US 8,483,305 B2
(45) Date of Patent: Jul. 9, 2013

(54) APPARATUS AND METHOD FOR SPATIAL MULTIPLEXING IN MULTI INPUT MULTI OUTPUT SYSTEM

(75) Inventors: Inkyu Lee, Seoul (KR); Sung-Hyun Moon, Seoul (KR); Chae-Man Lim, Seoul (KR)

(73) Assignees: Samsung Electronics Co., Ltd (KR); Korea University Industrial & Academic Collaboration Foundation (KR)

( * ) Notice: Subject to any disclaimer, the term of this patent is extended or adjusted under 35 U.S.C. 154(b) by 1087 days.

(21) Appl. No.: 12/467,765

(22) Filed: May 18, 2009

(65) Prior Publication Data

US 2009/0285324 A1 Nov. 19, 2009

(30) Foreign Application Priority Data

May 16, 2008 (KR) .................. 10-2008-0045797

(51) Int. Cl.
*H04L 1/02* (2006.01)

(52) U.S. Cl.
USPC ........................................... 375/267

(58) Field of Classification Search
USPC ................. 375/267, 299, 300, 316, 347, 349, 375/350; 455/69, 101, 272
See application file for complete search history.

(56) References Cited

U.S. PATENT DOCUMENTS

| | | | | |
|---|---|---|---|---|
| 6,298,092 | B1* | 10/2001 | Heath et al. | 375/267 |
| 2007/0189416 | A1* | 8/2007 | Kim et al. | 375/299 |
| 2007/0213013 | A1* | 9/2007 | Kim | 455/69 |
| 2009/0307558 | A1* | 12/2009 | Lee et al. | 714/749 |

* cited by examiner

*Primary Examiner* — Khai Tran
(74) *Attorney, Agent, or Firm* — The Farrell Law Firm, P.C.

(57) ABSTRACT

Methods and apparatus for spatial multiplexing in a closed-loop Multi Input Multi Output (MIMO) system are provided. In a method of operating a receiver in an MIMO system, a signal transmitted by a transmitter is received. Blockwise-Orthogonalized Spatial Multiplexing (B-OSM) is performed on the received signal. Feedback information determined by performing the B-OSM on the received signal is fed back to the transmitter.

20 Claims, 5 Drawing Sheets

APPARATUS AND METHOD FOR SPATIAL MULTIPLEXING IN MULTI INPUT MULTI OUTPUT SYSTEM

PRIORITY

This application claims priority under 35 U.S.C. §119(a) to a Korean patent application filed in the Korean Intellectual Property Office on May 16, 2008 and assigned Serial No. 10-2008-0045797, the entire disclosure of which is incorporated herein by reference.

BACKGROUND OF THE INVENTION

1. Field of the Invention

The present invention relates generally to Multi Input Multi Output (MIMO) systems, and more particularly, to an apparatus and method for spatial multiplexing capable of supporting a large number of data streams in a MIMO system.

2. Description of the Related Art

A great deal of research has been conducted in the area of system capacity in MIMO communication systems.

In association with the MIMO communication systems, an Orthogonalized Spatial Multiplexing (OSM) method has been proposed whereby a simple receiver is allowed to perform simple Maximum Likelihood (ML) decoding using a small amount of feedback information. In the OSM method, channel orthogonality can be determined when a transmitter performs a simple conversion operation.

The OSM method is a transmission method for a closed-loop MIMO communication system. Unlike an open-loop system, the closed-loop system performs precoding before symbols are transmitted by a transmitting end, and receives information for the precoding from a receiving end through a feedback channel path.

The OSM method can utilize single phase information $\theta$ as feedback channel information. Through the use of the single phase information $\theta$, the transmitting end can rotate a Transmit (Tx) symbol vector by performing preceding, and thus can perform a desired transmission. Further, the OSM method provides excellent transmission performance in the closed-loop MIMO system having only a single feedback phase information and low Receive (Rx) complexity.

However, in the OSM method only two Tx symbols (i.e., two data streams) can be transmitted due to a structural feature of precoding. A system having two or more Tx antennas can maximize performance in combination with an antenna selection method. However, in this case, a data rate decreases since a multiplexing gain cannot be maximized.

SUMMARY OF THE INVENTION

The present invention has been made to address at least the above problems and/or disadvantages and to provide at least the advantages described below.

Accordingly, an aspect of the present invention provides an apparatus and method for spatial multiplexing in a MIMO system.

Another aspect of the present invention provides an apparatus and method for OSM capable of supporting a plurality of data streams in a MIMO system.

According to one aspect of the present invention, a method is provided for operating a receiver in an MIMO system. A signal transmitted by a transmitter is received. Blockwise-Orthogonalized Spatial Multiplexing (B-OSM) is performed on the received signal. Feedback information determined by performing the B-OSM on the received signal is fed back to the transmitter.

According to another aspect of the present invention, a method is provided for operating a transmitter in an MIMO system. Feedback information transmitted by a receiver is received. All data streams are divided into a specific number of independent sub-groups according to paring information of the feedback information. Precoding is performed on the independent sub-groups.

According to a further aspect of the present invention, a receiving apparatus in an MIMO system is provided. The apparatus includes a receiver for receiving a signal transmitted by a transmitter, and a filter for feeding back, to the transmitter, feedback information determined by performing B-OSM on the received signal.

According to an additional aspect of the present invention, a transmitting apparatus in an MIMO system is provided. The apparatus includes a receiving unit for receiving feedback information transmitted by a receiver. The apparatus also includes a precoder for dividing all data streams into a specific number of independent sub-groups according to paring information contained in the feedback information, and for performing precoding on the independent sub-groups.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF PREFERRED EMBODIMENTS

Figure 1:
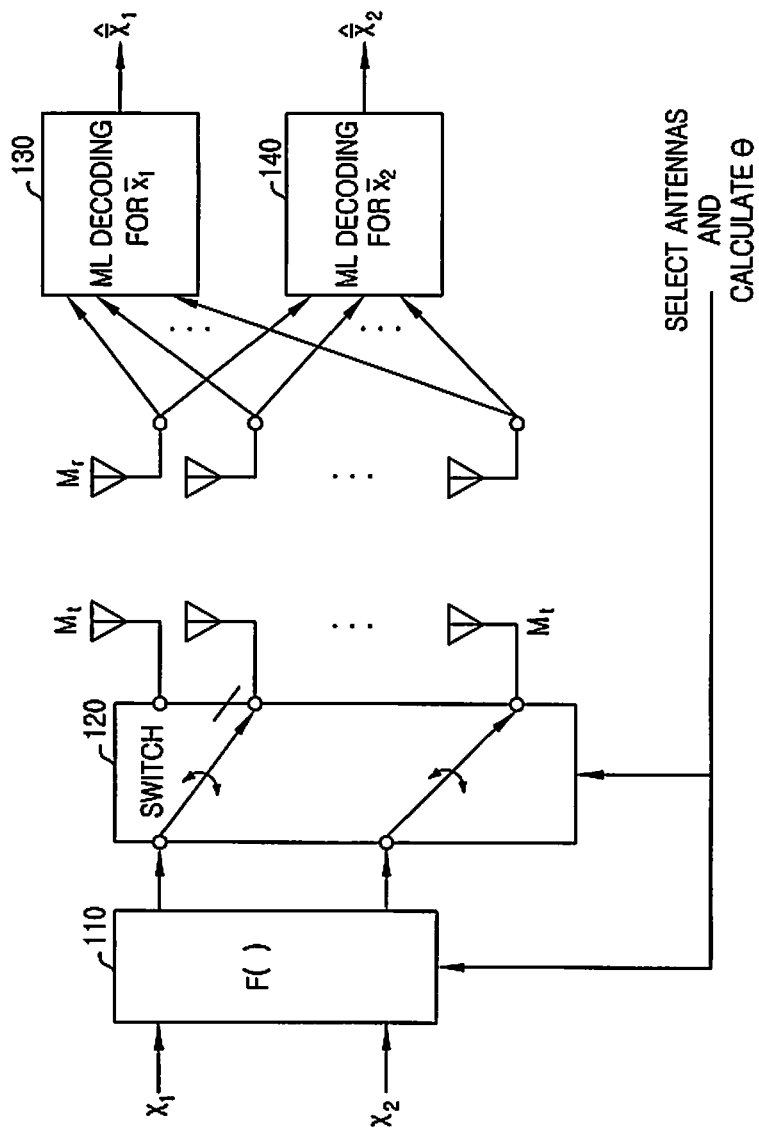
FIG. 1 is a block diagram illustrating a structure of a transmitting/receiving apparatus in an OSM system, according to an embodiment of the present invention.

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Hereinafter, an apparatus and method for spatial multiplexing in a MIMO system will be described.

The present invention is an extension of the aforementioned OSM so as to use the OSM in a general environment. An OSM system is first described below.

FIG. 1 is a block diagram illustrating a structure of a transmitting/receiving apparatus in an OSM system, according to an embodiment of the present invention.

Referring to FIG. 1, an OSM method combined with an antenna selection method generally uses $M_t$ Transmit (Tx) antennas and $M_r$ Receive (Rx) antennas. Two optimal antennas are selected (by a switch 120) from the $M_t$ Tx antennas and the selected antennas are used for transmission.

It is assumed in an embodiment of the present invention that the number of Tx antennas is 2 without considering the antenna selection method. A model of the OSM system is expressed by Equation (1) below. Herein, precoding is performed by a precoder F( ) 110.

$$y = HF(x,\theta) + n = H_\theta s(x) + n \tag{1}$$

In Equation (1), H denotes an $M_r \times 2$ channel matrix. Elements of the matrix are independent from one another, while having a complex Gaussian distribution of which an average is '0' and a dispersion is '1'. It is assumed that the channel matrix H is fully known to a receiving end. $H_\theta$ denotes an effective channel matrix determined by performing the OSM. In the channel matrix $H_\theta$, a subscript θ denotes a value used to allow spaces formed by channel matrixes to be orthogonal to one another.

x denotes a Tx symbol vector consisting of two Tx symbols $x_1$ and $x_2$. $y = [y_1 \ldots y_{N_r}]^T$ and denotes a Tx signal vector n denotes a complex Additive White Gaussian Noise (AWGN) vector. A covariance matrix of the noise vector n is assumed to be $\sigma_n^2 I$.

$F(x,\theta)$ implies OSM precoding and is a function for coding two Tx symbols according to Equation (2) below.

$$F(x, \theta) = \begin{bmatrix} 1 & 0 \\ 0 & \exp(j\theta) \end{bmatrix} s(x) \tag{2}$$

In Equation (2), s(x) is defined by Equation (3) below.

$$s(x) \triangleq \begin{bmatrix} \Re[x_1] + j\Re[x_2] \\ \Im[x_1] + j\Im[x_2] \end{bmatrix} \tag{3}$$

In Equation (3), R[x] and I[x] respectively denote a real part and an imaginary part of a complex value x.

In Equation (2) above, θ denotes a rotation angle for ensuring orthogonality between new symbols configured by using s(x), and is expressed by Equation (4) below.

$$\theta = \tan^{-1}\left(\frac{h_{r,1}^\theta \cdot h_{r,4}^\theta}{h_{r,1}^\theta \cdot h_{r,2}^\theta}\right) \tag{4}$$

The value θ is determined by the receiving end, which fully knows channel information, and is delivered to a transmitting end through a feedback path. This can be implemented with a simple determination in a "closed-form" manner. Thus, there is an advantage in that computational complexity is almost not required when a precoder is designed in the OSM system.

The OSM enables symbol-by-symbol detection when optimal ML detection is performed (by ML decoders 130 and 140) in the receiving end by transmitting respective symbols to orthogonal spaces. As a result, Rx complexity significantly decreases.

On the other hand, a typical open-loop MIMO system does not ensure orthogonality between Tx symbols, and thus a joint ML estimation method is required. As a result, Rx complexity exponentially increases in proportion to the number of Tx antennas.

Figure 2:
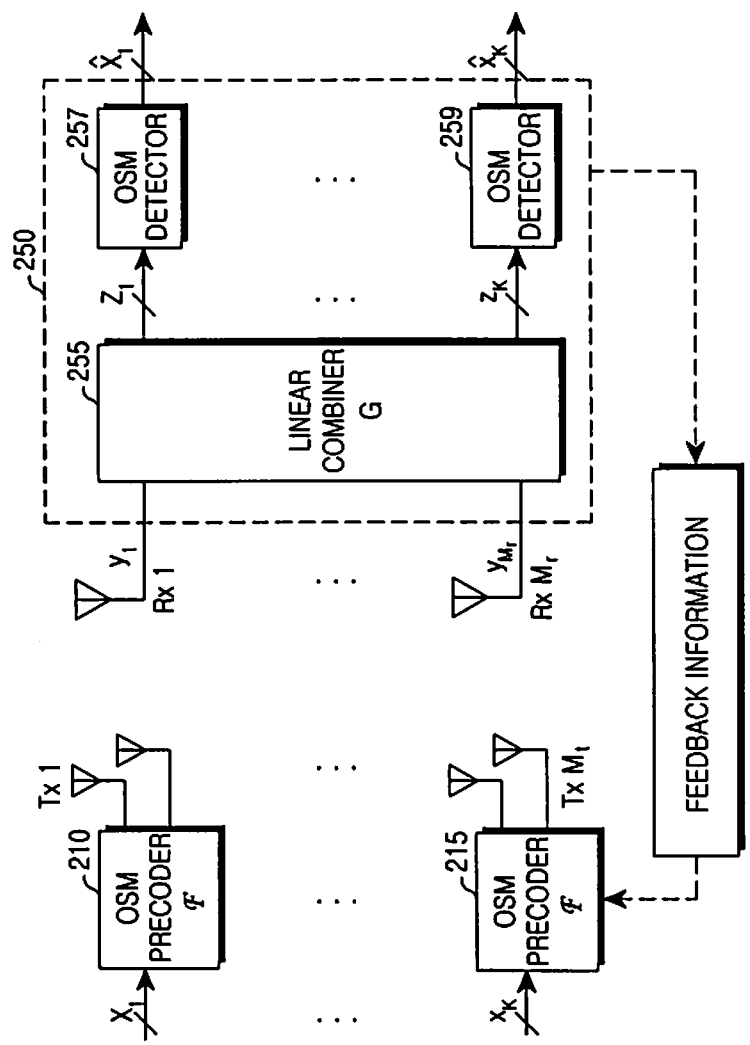
FIG. 2 is a block diagram illustrating a structure of a transmitting/receiving apparatus in a B-OSM system, according to an embodiment of the present invention.

FIG. 2 is a block diagram illustrating a structure of a transmitting/receiving apparatus in a B-OSM system, according to an embodiment of the present invention.

Referring to FIG. 2, a receiving end 250 determines a linear Rx filter G of a linear combiner 255. In an embodiment of the present invention, all data streams can be divided into K independent sub-groups by the use of the Rx filter G. Each independent sub-group transmits data by performing OSM in a block unit.

In a multiple user Multiple Access Channel (MAC) environment, the sub-groups may be respectively analyzed as independent users. Each user can transmit two streams. When independent channels are formed for each of K users, each user transmits data after performing OSM precoding on the data.

A signal z output from a filter of a Base Station (BS) can be expressed as shown in Equation (5).

$$z = GHF_B(x,\theta) + Gn = H_G F_B(x,\theta) + v \tag{5}$$

In Equation (5), $F_B(x,\theta)$ denotes OSM coding of Equation (6) below. HG (i.e., $H_G = HG$) denotes an effective channel. v denotes a filter output noise vector having a covariance matrix of $\sigma_n^2 GG^H$.

$$F_B(x, \theta) = \begin{bmatrix} 1 & 0 \\ 0 & \exp(j\theta) \end{bmatrix} s(x) \tag{6}$$

Division of all streams into several sub-groups belongs to a second best reception method as known as Group Detection (GD).

A new method for designing the Rx filter G is now described. An original channel matrix H is expressed by Equation (7) below.

$$H = [H_1 H_2 \ldots H_K] \tag{7}$$

In Equation (7), $H_k$ denotes an effective channel matrix of a $k^{th}$ sub-group (i.e., $H_k = [h_{k,1} \ h_{k,2}]$). A "complementary" channel matrix $\tilde{H}_k$ of the effective channel matrix $H_k$ is defined by Equation (8) below. The Rx filter G is also expressed in the same manner.

$$\tilde{H}_k = [H_1 \ldots H_{k-1} H_{k+1} \ldots H_K]$$

$$G = [G_1^T G_2^T \ldots G_K^T]^T \tag{8}$$

Embodiments of the present invention have a purpose of determining a matrix $G_k$ so that a channel $H_k$ of the $k^{th}$ sub-group does not experience interference with a channel $\tilde{H}_k$, that is, $G_k = [g_{k,1}^T g_{k,2}^T]^T$. The matrix $G_k$ for completely canceling interference has to satisfy a "null constraint" of Equation (9) below.

$$G_k \tilde{H}_k = 0 \tag{9}$$

Conventionally, a solution of Equation (9) above is determined by using a projection matrix, and in this case, interference between sub-groups can be completely cancelled. However, as is well known in the analysis of a conventional multi-antenna linear Zero Forcing (ZF) receiver, noise power increases in a process of passing a filter in a method of completely canceling interference. As a result, an Rx Signal-to-Noise-Ratio (SNR) decreases.

Accordingly, embodiments of the present invention provides a solution of the "null constraint" of Equation (9) above. The present method can be easily extended to a regularized version by using a Minimum Mean Square Error (MMSE) solution.

First, the conventional multi-antenna linear ZF or MMSE receiver can be expressed for the channel H by Equation (10) below.

$$G_{ZF} = (H^H H)^{-1} H^H$$

$$G_{MMSE} = (H^H H + \sigma_n^2)^{-1} H^H \quad (10)$$

In Equation (10), a filter $G_{MMSE}$ is optimized for MMSE. The filter $G_{MMSE}$ does not completely cancel interference but provides an optimal solution by considering a noise signal. Therefore, the filter $G_{MMSE}$ has superior performance to a ZF filter $G_{ZF}$.

In this case, an $i^{th}$ row of the Rx filter $G_{ZF}$ or $G_{MMSE}$ is used to cancel interference with remaining (i−1) column spaces from an $i^{th}$ column of the channel H in order to detect an $i^{th}$ Tx symbol.

For example, a $1^{st}$ row $g_{ZF,1}$ of the filter $G_{ZF}$ produces a channel gain of a $1^{st}$ column of the channel H and completely cancels interference with another signal space (i.e., $g_{ZF,1}$ H=[1 0 . . . 0]).

The system in embodiments of the present invention uses the solution of the filter $G_{MMSE}$ for the aforementioned purposes. Further, a filter $G_k$ of a regularized version is designed according to Equation (11) below.

$$g_{k,i} = \lfloor (\bar{H}_{k,i}^H \bar{H}_{k,i} + \sigma_n^2 I_{M_t-1})^{-1} \hat{H}_{k,i}^H \rfloor_{(1;)}, \ i=1,2 \quad (11)$$

In Equation (11), $[A]_{(1;)}$ denotes a $1^{st}$ row of a matrix A. $\bar{H}_{k,i}$ denotes a matrix expressed by $\bar{H}_{k,i}=[h_{k,i} \ \hat{H}_k]$, where $h_{k,i}$ is a channel vector and $\bar{H}_k$ is an interference channel matrix.

A solution of Equation (11) above can be determined in accordance with the aforementioned example. If i=1, a filter $g_{k,1}$ for canceling interference of $\tilde{H}_k$ is generated according to a space of $h_{k,1}$. If i=2, a filter $g_{k,2}$ for canceling interference of $\tilde{H}_k$ is generated according to a space of $h_{k,2}$.

Accordingly, $G_k = [g_{k,1}^T \ g_{k,2}^T]^T$ is determined as a result. The determined filter $G_k$ satisfies a $k^{th}$ sub-group (i.e., $H_k = [h_{k,1} \ h_{k,2}]$), and performs a function for canceling influence of an interference channel $\tilde{H}_k$.

Herein, two rows of the matrix $G_k$ are independently determined because it is difficult to determine an MMSE solution for the matrix $G_k$ in a block unit.

Instead of the solution of the filter $G_{MMSE}$, a filter which satisfies the "null constraint" can be designed using an expression of the filter $G_{ZF}$. As described above, the filter designed in this manner has poor performance.

A design rule based on the solution of the filter $G_{MMSE}$ and provided in embodiments of the present invention does not exactly satisfy the "null constraint" and thus permits interference with other sub-groups to some extent. However, since an optimal solution is provided by considering noise power, a performance gain can be determined in a region having a low SNR.

In general, the values $g_{k,1}$ and $g_{k,2}$ determined by the aforementioned design rule, are not orthogonal to each other. Therefore, it is not assumed that white noise is produced when a noise vector passes the filter $G_k$.

When noise is not white noise, a covariance matrix of noise does not have the form of a unit matrix. Thus, if this problem is not considered in a detection process, performance deterioration occurs. If this problem is considered in the detection process, computational complexity increases.

In embodiments of the present invention, orthogonality is ensured by performing "Gram-Schmidt orthogonalization" in a row space (i.e., between $g_{k,1}$ and $g_{k,2}$) of the matrix $G_k$.

Therefore, noise can maintain a white noise property even after filtering, and thus ML detection can be performed according to a conventional maximum Euclidean distance rule. The "Gram-Schmidt orthogonalization" is expressed by Equation (12) below.

$$g_{k,1} \leftarrow g_{k,1}/\|g_{k,1}\|$$

$$g_{k,2} \leftarrow g_{k,2}(I_{M_t} - g_{k,1}^H g_{k,1}/\|g_{k,1}\|^2), \text{ then } g_{k,2} \leftarrow g_{k,2}/\|g_{k,2}\| \quad (12)$$

In a system model, an effective channel matrix $H_\theta$ is expressed by Equation (13) below when applying the Rx filter G produced by the design rule.

$$H_G = \begin{bmatrix} H_{G,1} & G_1 H_2 & \cdots & G_1 H_K \\ G_2 H_1 & H_{G,2} & \cdots & G_2 H_K \\ \vdots & \vdots & \ddots & \vdots \\ G_K H_1 & G_K H_2 & \cdots & H_{G,K} \end{bmatrix} \quad (13)$$

In Equation (13), K diagonal elements denote effective channel matrixes of all users, and non-diagonal elements denote residual interferences between sub-groups.

The non-diagram elements have significantly smaller values than the diagonal elements. An Rx signal vector $z_k$ output from a $k^{th}$ user is expressed using $H_G$ according to Equation (14) below.

$$z_k = H_{G,k} F(x_k, \theta^{(k)}) + \sum_{j \neq k} G_k H_j F(x_j, \theta^{(j)}) + v_k \quad (14)$$

In Equation (14), $v_k$ denotes a noise vector for maintaining a white noise property by performing the aforementioned Gram-Schmidt operation (herein, $E[v_k v_k^H] = \sigma_n^2 G_k G_k^H = \sigma_n^2 I_2$).

The receiving end 250 feeds back respective rotation angles $\theta^{(k)}$ to a transmitting end. OSM precoders 210 and 215 of the transmitting end receive these values and perform precoding on the received values.

OSM detectors 257 and 259 detect symbols from signals filtered by the linear combiner G 255.

A finally determined effective channel model is mathematically identical to the conventional OSM model. Each user can maximize performance by performing OSM communication.

In addition, performance of the OSM method of the present invention can be improved by performing paring in a Group Detection (GD) process.

The paring is based on a minimum Euclidean distance $d_{min}$.

The minimum Euclidean distance is in association with a symbol error rate, and can be expressed by Equation (15) below.

$$\hat{n} = \arg \max_{1 \leq n \leq N} \left[ \min_{1 \leq k \leq K} d_{min}(n, k) \right] \quad (15)$$

In Equation (15), $d_{min}(n, k)$ denotes a minimum Euclidean distance of a $k^{th}$ sub-block of a channel rearranged in $n^{th}$ group paring. If $M_t$ is the number of Tx antennas, N is the number of all possible pair combinations in columns of $M_t$ channels, and K is the number of sub-block channels, then the value N satisfies $$N = \binom{M_t}{2}\binom{M_t-2}{2}\cdots\binom{2}{2}/K!,$$

where $$\binom{M_t}{2}$$

is the number of cases where 2 elements are selected from $M_t$ elements.

According to Equation (15) above, a combination of pairs having a greatest minimum distance is determined from a total of N pair combinations, and is then fed back to the transmitting end.

One of purposes of the OSM is to decrease Rx complexity. In the conventional ML method, complexity exponentially increases in proportion to the number of streams. However, when transmission is performed using the OSM, complexity can be decreased down to a symbol-by-symbol level while maintaining almost the same performance.

The OSM method of the present invention cancels interference between users and forms an independent channel for each user, thereby maintaining low complexity. Accordingly, the OSM method of the present invention has a detection complexity of a single-symbol decodable level.

Figure 3:
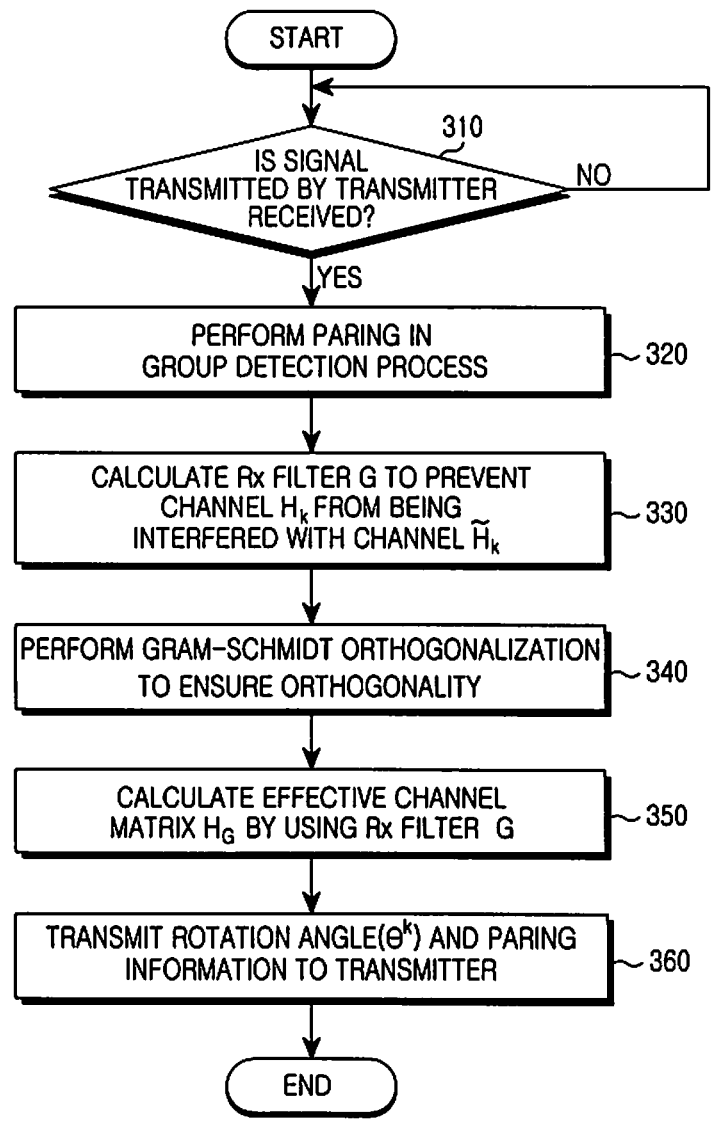
FIG. 3 is a flowchart illustrating an operation of a receiver, according to an embodiment of the present invention.

FIG. 3 is a flowchart illustrating an operation of a receiver, according to an embodiment of the present invention.

Referring to FIG. 3, it is determined whether the receiver receives a signal transmitted by a transmitter in step 310. If the signal is received, the receiver performs paring in a group detection process in step 320. The paring operation is expressed by Equation (15) above.

An Rx filter G is determined to prevent a channel $H_k$ from being interfered with a channel $\tilde{H}_k$ in step 330. An operation of determining the Rx filter is described in Equations (10), (11) and (12) above. In the operation of determining the Rx filter G, Gram-Schmidt orthogonalization is performed to ensure orthogonality in step 340.

An effective channel matrix $H_G$ is determined using the Rx filter in step 350. Paring information and rotation angle information $\theta^{(k)}$, determined using the Rx filter (see Equation (14)), are fed back to the transmitter in step 360.

Figure 4:
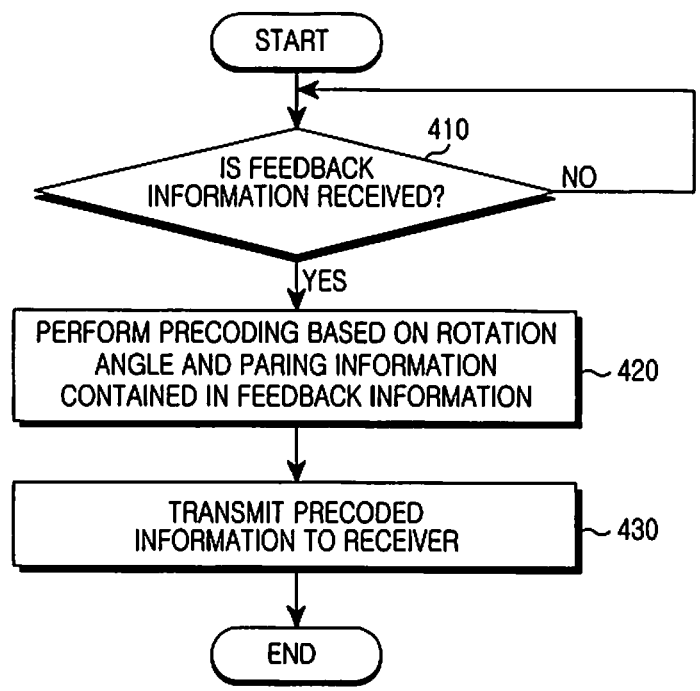
FIG. 4 is a flowchart illustrating an operation of a transmitter, according to an embodiment of the present invention.

FIG. 4 is a flowchart illustrating an operation of a transmitter, according to an embodiment of the present invention.

Referring to FIG. 4, the transmitter determines whether feedback information transmitted by a receiver is received in step 410. If feedback information is received, precoding is performed based on rotation angle information and paring information contained in the feedback information in step 420. The precoding operation is expressed by Equation (1) and Equation (4) above.

Thereafter, the precoded information is transmitted to the receiver in step 430.

Figure 5:
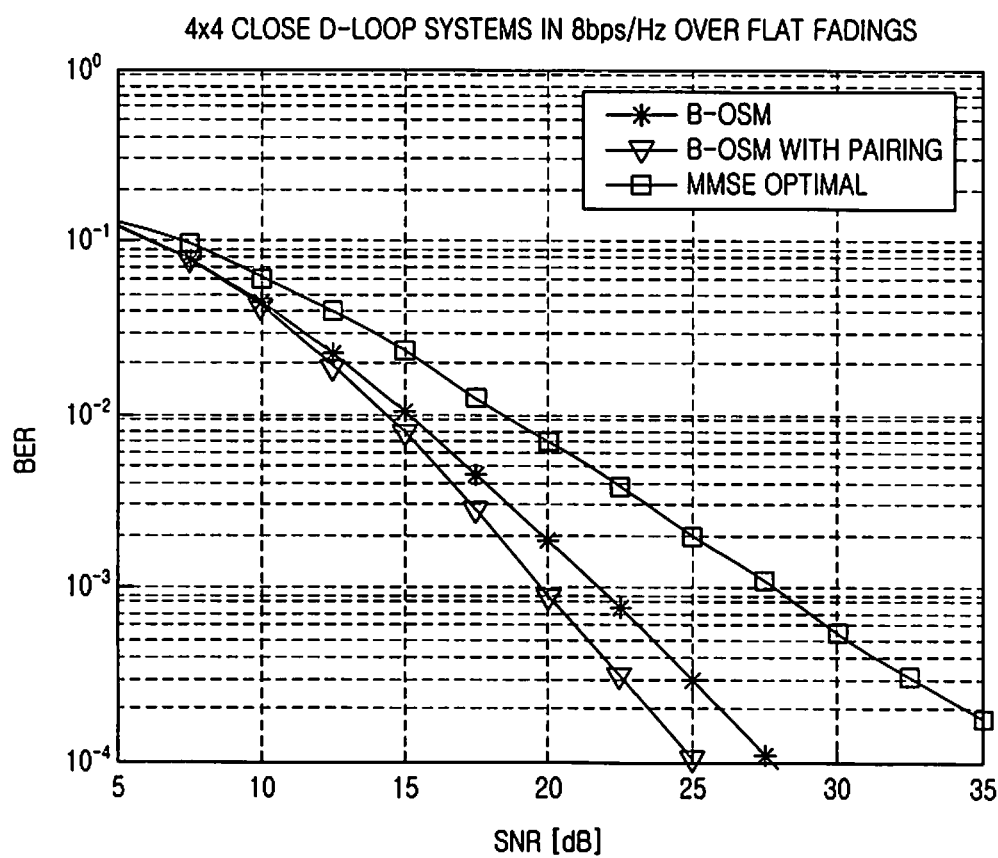
FIG. 5 is an error rate determined by a simulation, according to an embodiment of the present invention.

FIG. 5 illustrates an error rate determined by a simulation, according to an embodiment of the present invention.

Referring to FIG. 5, the number of Tx/Rx antennas is 4, and a "full spatial multiplexing" scenario using all 4 streams is assumed. 4-Quadrature Amplitude Modulation (QAM) is used as a modulation scheme, and a frequency parallel channel is assumed.

The method of the present invention is an extension of OSM (i.e., a B-OSM), and is compared with a conventional method using the same number of antennas.

The method of the present invention can be classified according to a single-user closed-loop MIMO method. The conventional method may be a precoding method optimized for MMSE. The preceding method can perform reception with small complexity, but is incapable of excellent performance in terms of an error rate due to an influence of a stream having poor performance.

In comparison with the conventional method, the method of the present invention can significantly improve performance while maintaining the same Rx complexity. In addition to the Rx complexity, the present method is further effective in terms of feedback complexity.

If the precoding method optimized for MMSE performs power loading, all pieces of channel information have to be fed back. On the other hand, the present method has no problem in the use of OSM in a blockwise manner by delivering only K pieces of phase information.

In FIG. 5, a solid-line with an asterisk (*) indicates a Block Error Rate (BER) performance of the B-OSM.

In comparison with a conventional method using Singular-Value Decomposition (SVD), the present method provides a high performance gain of about 10 dB at the level of $10^{-4}$. The conventional method requires all pieces of channel information when performing even the power loading. On the other hand, only two phase values are required as feedback channel information in a 4×4 B-OSM, and thus an amount of the feedback channel information is relatively efficient.

Regarding an additional gain that resulted from paring, a sub-group can be effectively divided according to a criterion for maximizing a minimum symbol distance. In this manner, performance is additionally improved by about 2.5 dB at the level of $10^{-4}$.

The amount of feedback information increases by 2 bits, which can be regarded as a significantly small increment in comparison with the observed performance gain. In summary, in comparison with the conventional method, the present method provides a performance gain of 12.5 dB in total while maintaining low Rx complexity, with a smaller amount of feedback information and without significant increase in complexity.

Meanwhile, if the present method is applied to a multi-user MAC system, a Block Diagonalization (BD) method can be considered. The BD method also effectively cancels interference between users in a transmitting end, but cannot provide an excellent error rate performance due to a stream having a poor performance, which is a limitation caused by the use of SVD.

An Rx antenna selection method is a method for providing an excellent error rate performance with a simple structure. However, the number of streams per user is limited to '1' in this method, which is undesirable in terms of a system data rate. The present method provides effective performance by considering advantages of the two methods in terms of the error rate and the data rate.

According to embodiments of the present invention, a maximum number of streams can be transmitted by addressing a constraint on the number of streams used in an OSM method, thereby maximizing a multiplexing gain. The present invention can also apply not only to a single-user environment but also to a multi-user MAC environment.

While the present invention has been shown and described with reference to certain preferred embodiments thereof, it will be understood by those skilled in the art that various changes in form and detail may be made therein without departing from the spirit and scope of the present invention as defined by the appended claims and their equivalents.

What is claimed is:

1. A method of operating a receiver in a Multi Input Multi Output (MIMO) system, the method comprising the steps of:
   receiving a signal transmitted by a transmitter;
   performing Blockwise-Orthogonalized Spatial Multiplexing (B-OSM) on the received signal; and
   feeding back, to the transmitter, feedback information determined by performing the B-OSM on the received signal.

2. The method of claim 1, wherein the performing of the B-OSM on the received signal comprises:
   performing paring on the received signal; and
   performing Receive (Rx) filtering to prevent a channel matrix for the pared signal from being interfered with by a complementary channel matrix of the channel matrix.

3. The method of claim 2, wherein paring is performed according to:

$$\hat{n} = \arg \max_{1 \leq n \leq N} \left[ \min_{1 \leq k \leq K} d_{min}(n, k) \right],$$

where $d_{min}(n, k)$ denotes a minimum Euclidean distance of a $k^{th}$ sub-block of a channel rearranged in $n^{th}$ group paring, and if $M_t$ is a number of Transmit (Tx) antennas, N is a number of all possible pair combinations in columns of $M_t$ channels, and K is a number of sub-block channels, then a value of N satisfies $$N = \binom{M_t}{2}\binom{M_t-2}{2}\cdots\binom{2}{2} / K!,$$

where $$\binom{M_t}{2}$$

is a number of cases where 2 elements are selected from $M_t$ elements.

4. The method of claim 2, wherein the performing of the Rx filtering comprises satisfying a null constraint expressed by:

$$G_k \tilde{H}_k = 0$$

where $G_k$ denotes a filter of the receiver.

5. The method of claim 4, wherein the satisfying of the null constraint comprises ensuring orthogonality by performing Gram-Schmidt orthogonalization according to:

$$g_{k,1} \leftarrow g_{k,1}/\|g_{k,1}\|$$

$$g_{k,2} \leftarrow g_{k,2}(I_{M_t} - g_{k,1}g_{k,1}^H/\|g_{k,1}\|^2), \text{ then } g_{k,2} \leftarrow g_{k,2}/\|g_{k,2}\|,$$

where $g_k$ denotes a filter of the receiver, and $M_t$ denotes a number of Tx antennas.

6. The method of claim 2, wherein the Rx filtering is in accordance with:

$$g_{k,i} = \lfloor (\overline{H}_{k,i}^H \overline{H}_{k,i} + \sigma_n^2 I_{M_t-1})^{-1} \hat{H}_{k,i}^H \rfloor_{(1;)}, i=1,2,$$

where $[A]_{(1;)}$ denotes a $1^{st}$ row of a matrix A, and $\overline{H}_{k,i}$ denotes a matrix expressed by $\overline{H}_{k,i} = [h_{k,i} \tilde{H}_k]$, where $h_{k,i}$ is a channel vector and $\tilde{H}_k$ is an interference channel matrix.

7. The method of claim 1, wherein the feedback information is at least one of rotation angle information and paring information.

8. A method of operating a transmitter in a Multi Input Multi Output (MIMO) system, the method comprising the steps of:
   receiving feedback information transmitted by a receiver;
   dividing all data streams into a specific number of independent sub-groups according to paring information of the feedback information; and
   performing preceding on the independent sub-groups.

9. The method of claim 8, wherein the feedback information is at least one of rotation angle information and the pairing information.

10. The method of claim 8, wherein preceding is performed in accordance with:

$$F_B(x, \theta) = \begin{bmatrix} 1 & 0 \\ 0 & \exp(j\theta) \end{bmatrix} s(x),$$

where F( ) denotes a precoding operation, θ denotes a rotation angle, and s(x) denotes a Transmit (Tx) signal.

11. A receiving apparatus in a Multi Input Multi Output (MIMO) system, the apparatus comprising:
   a receiver for receiving a signal transmitted by a transmitter; and
   a filter for feeding back, to the transmitter, feedback information determined by performing Blockwise-Orthogonalized Spatial Multiplexing (B-OSM) on the received signal.

12. The apparatus of claim 11, wherein the filter performs the B-OSM on the received signal by performing paring on the received signal and by performing Receive (Rx) filtering to prevent a channel matrix for the pared signal from being interfered with by a complementary channel matrix of the channel matrix.

13. The apparatus of claim 12, wherein the filter performs the paring according to:

$$\hat{n} = \arg \max_{1 \leq n \leq N} \left[ \min_{1 \leq k \leq K} d_{min}(n, k) \right],$$

where $d_{min}(n, k)$ denotes a minimum Euclidean distance of a $k^{th}$ sub-block of a channel rearranged in $n^{th}$ group paring, and if $M_t$ is a number of Transmit (Tx) antennas, N is a number of all possible pair combinations in columns of $M_t$ channels, and K is a number of sub-block channels, then a value of N satisfies $$N = \binom{M_t}{2}\binom{M_t-2}{2}\cdots\binom{2}{2} / K!,$$

where $$\binom{M_t}{2}$$

is a number of cases where 2 elements are selected from $M_t$ elements.

14. The apparatus of claim 12, wherein the Rx filtering performed by the filter satisfies a null constraint expressed by:

$$G_k \tilde{H}_k = 0,$$

where $G_k$ denotes a filter of the receiver.

15. The apparatus of claim 14, wherein, to satisfy the null constraint, the filter ensures orthogonality by performing Gram-Schmidt orthogonalization according to:

$$g_{k,1} \leftarrow g_{k,1}/\|g_{k,1}\|$$

$$g_{k,2} \leftarrow g_{k,2}(I_{M_t} - g_{k,1}{}^H g_{k,1}/\|g_{k,1}\|^2), \text{ then } g_{k,2} \leftarrow g_{k,2}/\|g_{k,2}\|'$$

where $g_k$ denotes a filter of the receiver, and $M_t$ denotes a number of Tx antennas.

16. The apparatus of claim 12, wherein the filter performs the Rx filtering according to:

$$g_{k,i} = \lfloor (\bar{H}_{k,i}{}^H \bar{H}_{k,i} + \sigma_n^2 I_{M_r-1})^{-1} \hat{H}_{k,i}{}^H \rfloor_{(1;)}, i=1,2,$$

where $[A]_{(1;)}$ denotes a $1^{st}$ row of a matrix A, and $\bar{H}_{k,i}$ denotes a matrix expressed by $\bar{H}_{k,i} = [h_{k,i} \; \tilde{H}_k]$, where $h_{k,i}$ is a channel vector and $\tilde{H}_k$ is an interference channel matrix.

17. The apparatus of claim 11, wherein the feedback information is at least one of rotation angle information and paring information.

18. A transmitting apparatus in a Multi Input Multi Output (MIMO) system, the apparatus comprising:
- a receiving unit for receiving feedback information transmitted by a receiver; and
- a precoder for dividing all data streams into a specific number of independent sub-groups according to paring information contained in the feedback information, and for performing preceding on the independent sub-groups.

19. The apparatus of claim 18, wherein the feedback information is at least one of rotation angle information and the paring information.

20. The apparatus of claim 18, wherein the precoder performs the precoding according to:

$$F_B(x, \theta) = \begin{bmatrix} 1 & 0 \\ 0 & \exp(j\theta) \end{bmatrix} s(x),$$

where F( ) denotes a preceding operation, θ denotes a rotation angle, and s(x) denotes a Transmit (Tx) signal.

* * * * *